United States Patent [19]

Montreuil

[11] Patent Number: 5,487,359

[45] Date of Patent: Jan. 30, 1996

[54] LOW AMPERAGE ELECTRONIC MILK LEVEL DETECTOR

[76] Inventor: Michel Montreuil, 13, rue Marie-Claude, St-Charles-de-Bellechasse, Québec, Canada, G0R 2T0

[21] Appl. No.: 207,708

[22] Filed: Mar. 9, 1994

[51] Int. Cl.[6] ........................................................ A01J 5/00
[52] U.S. Cl. .......................................................... 119/14.17
[58] Field of Search ........................... 119/14.17, 14.15, 119/14.14, 14.16

[56] References Cited

U.S. PATENT DOCUMENTS

| | | | |
|---|---|---|---|
| 3,726,252 | 4/1973 | Needham et al. | 119/14.08 |
| 3,773,016 | 11/1973 | Needham et al. | 119/14.08 |
| 3,837,318 | 9/1974 | Duncan et al. | 119/14.08 |
| 3,874,337 | 4/1975 | Umbaugh et al. | 119/14.17 X |
| 3,878,819 | 4/1975 | Harman | 119/14.08 |
| 3,919,975 | 11/1975 | Duncan | 119/14.05 |
| 3,978,460 | 8/1976 | Jaquith | 340/227 R |
| 4,034,711 | 7/1977 | Bender et al. | 119/14.11 |
| 4,047,500 | 9/1977 | Bender et al. | 119/14.11 |
| 4,372,249 | 2/1983 | Kiestra et al. | 119/14.17 |
| 4,391,222 | 7/1983 | Icking et al. | 119/14.17 |
| 4,401,055 | 8/1983 | Street et al. | 119/14.03 |
| 4,513,830 | 4/1985 | Persheck et al. | 119/14.17 X |
| 4,551,633 | 11/1985 | Winter et al. | 307/147 |
| 4,756,274 | 7/1988 | Rubino | 119/14.08 |
| 4,922,855 | 5/1990 | Tomizawa et al. | 119/14.15 |
| 5,052,341 | 10/1991 | Woolford et al. | 119/14.17 X |

FOREIGN PATENT DOCUMENTS 2355462 9/1972 Germany.
2124877 2/1984 United Kingdom.

OTHER PUBLICATIONS

"Threshold 60–Cycle Fibrillating Currents" C. F. Dalziel AIEE Winter General Meeting, New York, N.Y. Jan. 31–Feb. 5, 1960, pp. 667–673.
"Reevaluation of Lethal Electric Currents" C. F. Dalziel AIEE Transactions on Industry vol. 1GA–4 No. 5, Sep. Oct. 1968, pp. 467–476.

Primary Examiner—Thomas Price

[57] ABSTRACT

An electric device is adapted to detect the level of liquid in a receptacle in view of controlling this level of liquid. The receptacle is installed on a milking system for accumulating either milk drawn through piping of the milking system from at least an animal being milked or water during a washing operation of that piping. At least two electrodes are mounted in the receptacle. When the level of liquid reaches a predetermined level, the two electrodes are electrically interconnected and a detecting current flows through the liquid between the two electrodes. The detecting current has a frequency situated within a frequency range substantially higher than 60 Hz, in which the animal being milked has a lower sensitivity to electric current. The higher frequency of the detecting current also reduce a capacitive impedance formed by the two electrodes and the water during the washing operation of the milking system to thereby enable a low-intensity detecting current to be established both in milk and water with low-amplitude voltages applied to the electrodes.

8 Claims, 4 Drawing Sheets

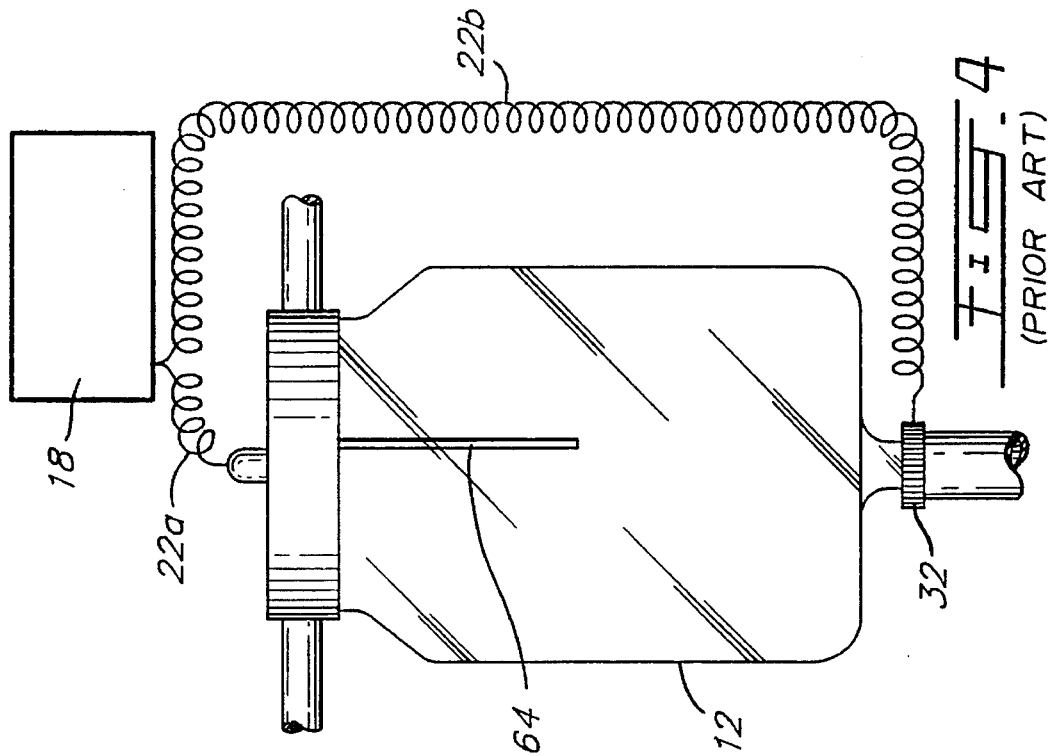
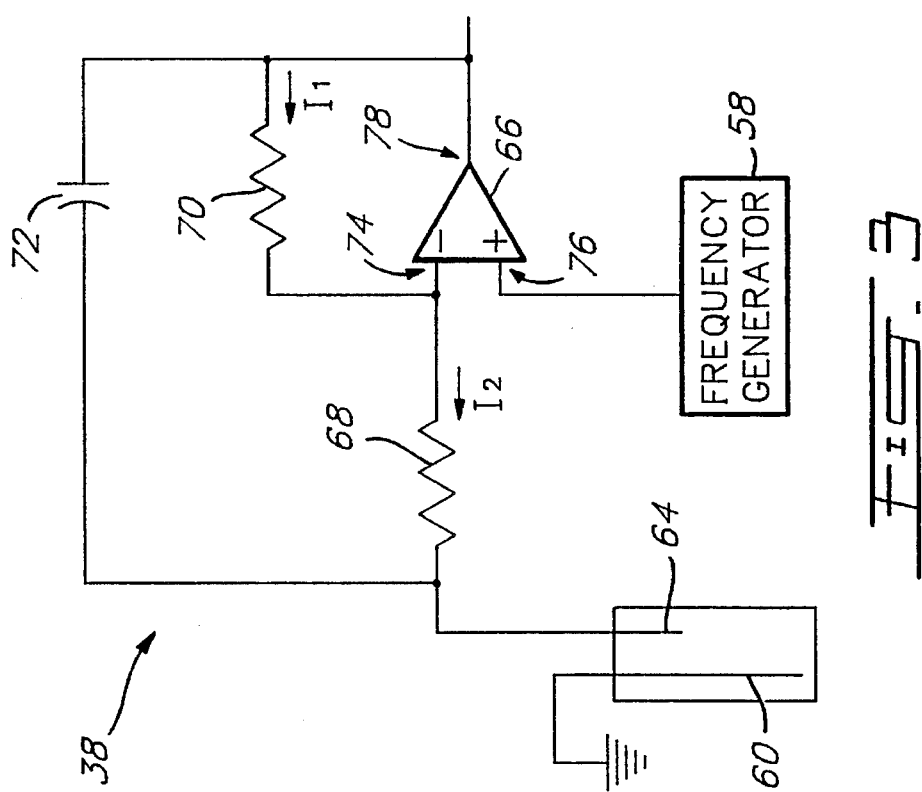

5,487,359

LOW AMPERAGE ELECTRONIC MILK LEVEL DETECTOR

BACKGROUND OF THE INVENTION

1. Field of the Invention

The present invention relates to an electric device for detecting the level of milk in a receptacle installed in a milking system for accumulating milk drawn from at least one animal. The device of the invention is designed to reduce as much as possible the production of stray current susceptible to affect the animal being milked.

2. Brief description of the prior art

The milking of cows has become over the years highly automated. In the present vacuum milking systems, milk pipes continuously carry the milk drawn from the cows being milked toward a milk storage tank. Creation of an adequate vacuum in the milk storage tank to draw the milk thereto is problematic as the storage tank is large and cannot be adequately sealed because of the various stirring and cooling equipments connected thereto.

To solve this problem, a smaller milk jar is installed in the milking system between the milk-conveying pipes and the storage tank. A vacuum is created in this jar to draw the milk therein. When the milk accumulated in the jar reaches a given level, a pump is activated to transfer milk from the jar to the storage tank.

To detect the level of milk, electrodes are mounted in the jar at predetermined levels. A controller monitors the level of milk through the electrodes to activate the pump and transfer the milk from the jar to the storage tank.

The operation of the prior art pump controllers is simple. It consists of establishing an AC current having a frequency of 60 Hz through the milk when two electrodes are interconnected by the milk, to thereby indicate that the milk has reached a predetermined level in the jar. This current energizes the coil of a relay to close its normally open contacts and activate the pump to transfer the milk from the jar to the storage tank.

To establish the current through the milk, the prior art controllers apply to one of the electrodes a voltage of 60 Hz of sufficient amplitude to create a stray current affecting the cows being milked. As milk is a very good electric conductor because of the large quantity of fat particles it contains, the electrode voltage establish a stray current from the electrode, the milk in the jar, milk residue on the inner surface of the milk pipes, the teat cup clusters, the cow and the ground. This is a major drawback since animals, including cows are very sensitive to 60 Hz currents flowing through their body. Behavior anomalies such as nervousness and restlessness have been noticed on cows subjected to 60 Hz currents as low as 1 mA. Since these currents flow through the teats and udder of the cows, they cause problems such as milk retention, whitened teats, sphincter problems, rise in the quantity of somatic cell count. Of course, diminution of production can arise from these stray currents.

OBJECTS OF THE INVENTION

An object of the present invention is therefore to overcome the above discussed drawbacks of the prior art.

Another object of the invention is to provide a device to be installed in the pump controller and using higher frequency current for detecting the level of milk in the jar.

SUMMARY OF THE INVENTION

More specifically, in accordance with the present invention, there is provided an electric device for detecting the level of milk in a receptacle in view of controlling this milk level, receptacle installed in a milking system for accumulating milk drawn through piping of the milking system from at least one animal being milked. The receptacle comprises at least two electrodes mounted therein to be electrically interconnected through the milk when a predetermined level of milk is reached, and the milk level detecting device comprises:

- means for generating a detecting current through the milk between the two electrodes when the predetermined level of milk is reached, the current generating means also producing a stray current through a circuit including one of the two electrodes, milk residue on the inner surface of the piping of the milk system, and the animal being milked; and
- means for sensing the detecting current to thereby detect reaching of the predetermined level of milk.

The animal has a lower sensitivity to electric current at frequencies situated within a frequency range substantially higher than 60 Hz, and wherein the detecting and stray currents have a frequency situated within this frequency range to reduce the sensitivity of the animal being milked to the stray current.

Also in accordance with the subject invention, there is provided an electric device for detecting the level of liquid in a receptacle in view of controlling that liquid level, receptacle installed in a milking system for accumulating either milk drawn through piping of the milking system from at least one animal being milked or water during a washing operation of the milking system to remove milk residue from the inner surface of the piping. The receptacle comprises at least two electrodes mounted therein to be electrically interconnected through the liquid when a predetermined level of this liquid is reached, and the level detecting device comprises:

- means for generating a low amplitude detecting current through the liquid between the two electrodes when the predetermined level of liquid is reached, the current generating means also producing, when the milking system is operated to milk at least one animal, a stray current through a circuit including one of the two electrodes, milk residue on the inner surface of the piping of the milking system, and the animal being milked; and
- means for sensing the low amplitude detecting current to thereby detect reaching of the predetermined level of liquid.

The sensitivity of the animal to electric current being lower at frequencies situated within a frequency range substantially higher than 60 Hz, the detecting and stray currents have a frequency situated within this frequency range to reduce the sensitivity of the animal being milked to the stray current. The higher frequency of the detecting current also reduces a capacitive impedance formed by the two electrodes and water during the washing operation whereby the low amplitude detecting current is established both in milk and water with low amplitude voltages applied to the electrodes to thereby produce a stray current of lower amplitude.

Preferably, the frequency range is comprised between 0.5 kHz and 1 MHz, and the low amplitude detecting current flowing through the liquid between the two electrodes has a frequency of 15 kHz.

In accordance with another preferred embodiment of the level detecting device of the invention, the detecting current generating means comprise means for limiting the low amplitude of this detecting current.

The objects, advantages and other features of the present invention will become more apparent upon reading of the following non restrictive description of preferred embodiments thereof, given by way of example only with reference to the accompanying drawings.

BRIEF DESCRIPTION OF THE DRAWINGS

In the appended drawings:

FIG. 3 is the electronic circuit of a ground sensing circuit of the milk level detector of FIG. 2;

FIG. 4, which is labelled as "prior art", is a first embodiment of milk jar forming part of the milking system of FIG. 1, comprising two electrodes;

DETAILED DESCRIPTION OF THE PREFERRED EMBODIMENT

Figure 1:
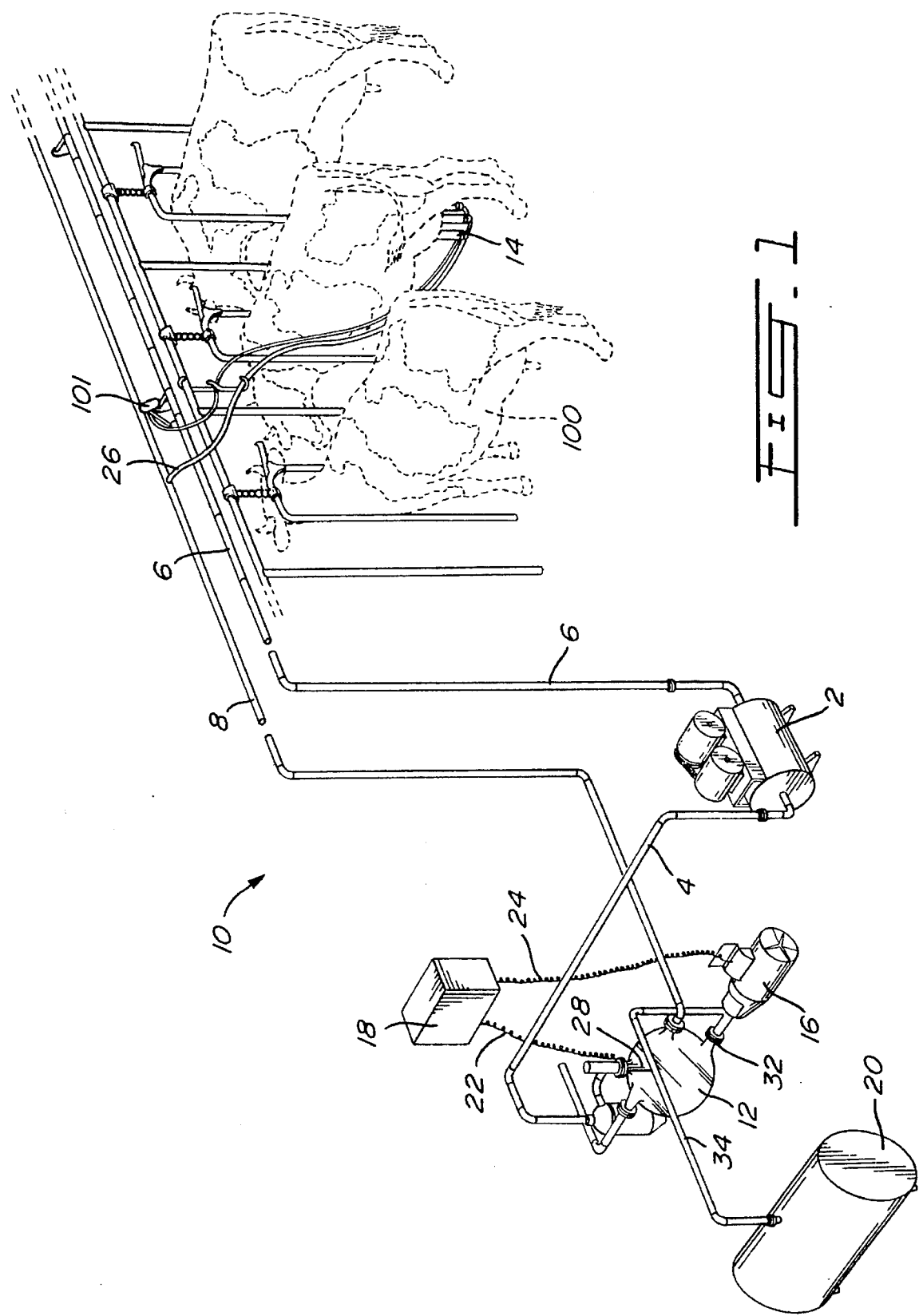
FIG. 1, which is labelled as "prior art", is a schematic, perspective view of a conventional milking system.

Referring now to the appended drawings, FIG. 1 is a simplified illustration of a conventional milking system 10. The milking system 10, as illustrated, principally comprises an air compressor 2, a vacuum line 6 extending in front of a series of cows such as 100, a milk jar 12, a vacuum line 4 interconnecting the compressor 2 and the milk jar 12, a milk pipe 8 extending parallel to the line 6 in front of the cows 100 and connected to the compressor 2 through the milk jar 12 and vacuum line 4, teat cup clusters such as 14 connectable to both the line 6 and the pipe 8, a milk storage tank 20, a pump 16 interconnecting the bottom of the milk jar 12 and the storage tank 20, and an electronic pump controller 18.

The compressor 2 therefore establishes a vacuum in the lines 4 and 6, and in the milk jar 12 and pipe 8. Each teat cup cluster 14 is connected to the vacuum line 6 through an electric or pneumatic valve unit 101 for intermittently applying vacuum at a predetermined repetition rate to the cups and thereby press the teats of the cow's udder to draw milk from the cow. The milk drawn from the cow's teats is sucked by the vacuum from the compressor 2 through a milk line 26 interconnecting the teat cups and the milk pipe line 8, and that milk pipe 8 to reach the jar 12 in which it accumulates. As the line 4 is connected to the top of the jar 12, the milk will not reach the compressor through this line.

Electrodes 28 are mounted in the milk jar 12 to monitor the level of milk therein. A cable 22 electrically connects the electrodes 28 to the electronic pump controller 18. When the milk reaches a predetermined level, this is detected by the controller 18 through the electrodes 28 to energize the pump 16 via a cable 24 and thereby transfer the milk from the jar 12 to the milk storage tank 20.

Figure 6:
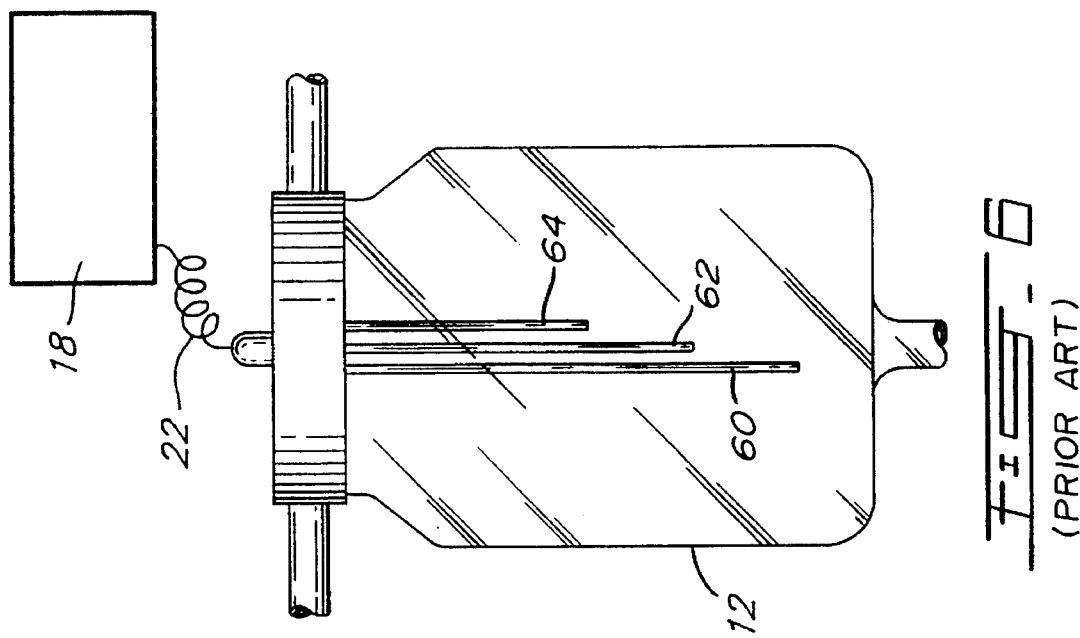
FIG. 6, which is labelled as "prior art", is a third embodiment of milk jar forming part of the milking system of FIG. 1, also comprising three electrodes.
Figure 5:
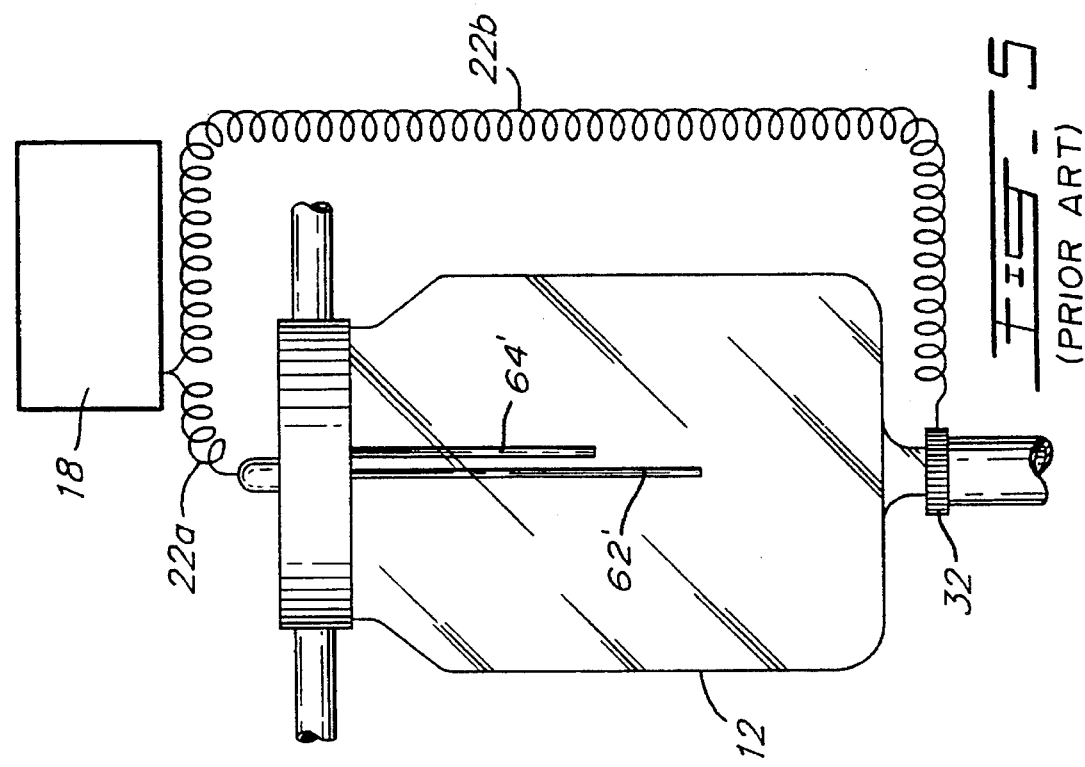
FIG. 5, which is labelled as "prior art", is a second embodiment of milk jar forming part of the milking system of FIG. 1, comprising three electrodes.

There are three types of arrangements of electrodes in the milk jar 12 as illustrated in FIGS. 4, 5 and 6.

Referring first to FIG. 4, the milk jar 12 comprises a high-level sensing electrode 64 mounted vertically to the top of the jar 12. The electrode 64 is connected to the pump controller 18 through an electric wire 22a. Another electric wire 22b connects to the controller 18 the metallic joint 32 between the jar 12 and the pump 16 (FIG. 1), this metallic joint forming a second reference electrode. When the level of milk reaches the electrode 64, an electric connection is established through the milk between the electrode 64 and the electrode (metallic joint) 32 which is in contact with the milk in the jar 12. This electric connection is detected by the controller to activate the pump 16. With the embodiments of figures 4 and 5, a timer (not shown) forming part of the controller 18 must be provided to control the duration of operation of the pump 16 since there is no low-level sensing electrode.

The jar 12 of FIG. 5 comprises a high-level sensing electrode 62' used during milking and a high-level sensing electrode 64' used during washing, both mounted vertically to the top of the jar. Two electric wires 22a respectively connect the electrodes 62' and 64' to the controller 18, while the electric wire 22b connects the reference electrode (metallic joint) 32 to the same controller 18. The automatic selection of electrode 64' is usually done when the washing cycle is activated, otherwise electrode 62' is activated. The controller 18 will detect electric connection through the milk between the high-level electrode 62' and the electrode (metallic joint) 32 to activate the pump 16, or the controller 18 will detect electric connection through the water between the high-level electrode 64' and the electrode (metallic joint) 32 to activate the pump 16 during a washing cycle. As was the case with the embodiment of figure 4 and for the same reason, a timer (not shown) forming part of the controller 18 must be provided to control the duration of operation of the pump 16.

In FIG. 6, three electrodes 60, 62 and 64, of different lengths are mounted vertically to the top of the jar 12. The electrodes 60, 62 and 64 are connected to the pump controller 18 through the electric cable 22. When the level of milk reaches the high-level electrode 64, the controller 18 detects an electric connection through the milk between the high-level electrode 64 and the lower reference electrode 60 to activate the pump 16. When the level of milk subsequently lowers, the controller 18 will detect electric disconnection between the low-level electrode 62 and the lower reference electrode 60 to turn the pump 16 off.

More specifically, conventional pump controllers often comprise a milk level detector including a first electrode (for example electrode 62 or 64) acting as "emitter" and a second electrode (for example the electrode 60 or the metallic joint 32) acting as "receiver". An AC (60 Hz) or DC voltage of arbitrary amplitude is applied to the "emitter" electrode and the "receiver" electrode is coupled to a circuit sensitive to the current produced by the voltage applied to the "emitter" electrode and flowing through the milk between the "emitter" and "receiver" electrodes. As well known to those of ordinary skill in the art, milk contains a large quantity of fat particles and therefore constitutes a very good electric conductor whereby electric connection established by the milk between the "emitter" and "receiver" electrodes can be used to indicate that the milk has reached a given level in the jar 12.

It should be pointed out here that, as well known to those of ordinary skill in the art, conventional milking systems are provided for automatically washing the milk pipes 8 and 34 and the jar 12. The level detector of the controller 18 has therefore to operate not only with milk but also with water containing detergent and/or acid.

A drawback of the conventional pump controllers 18 that operates at 60 Hz is the relatively large voltage amplitude applied to at least one of the electrodes 28. As milk has a high electric conductivity, it would be possible to substantially reduce this voltage amplitude and still produce a detectable current through the milk between the "emitter" and "receiver" electrodes. However, a relatively large voltage difference is required during the automatic washing operation as the electric conductivity of water, containing or not detergent and acid, is substantially lower than that of milk. Consequently, a higher voltage amplitude should be applied to the said at least one electrode to produce a voltage difference suitable to establish a detectable current.

For example, in the prior art, alternating voltage amplitudes as high as 2 to 25 Vac (60 Hz) have been applied to the electrodes 28 to conduct through the milk currents as high as 1–23 mA. Such a voltage amplitude, when applied to an electrode also produces a stray current flowing from that electrode through the milk in the jar 12, milk residue on the inner surface of the pipe 8 and line 26, and the body of the cow to reach the ground through the cow's hoofs which constitute good electric conductors. The cow's hoofs are normally in contact with the concrete forming the floor of the stable, which concrete is often wetted by urine and manure. As a concrete floor is normally at a potential close to 0 V (ground potential), the stray current will flow through the cow between the teat cup cluster 14 and the concrete floor. The stray current has, as discussed in the foregoing description, an amplitude sufficient to cause discomfort and affect the cow, causing behavior anomalies thereof and associated problems.

Figure 2:
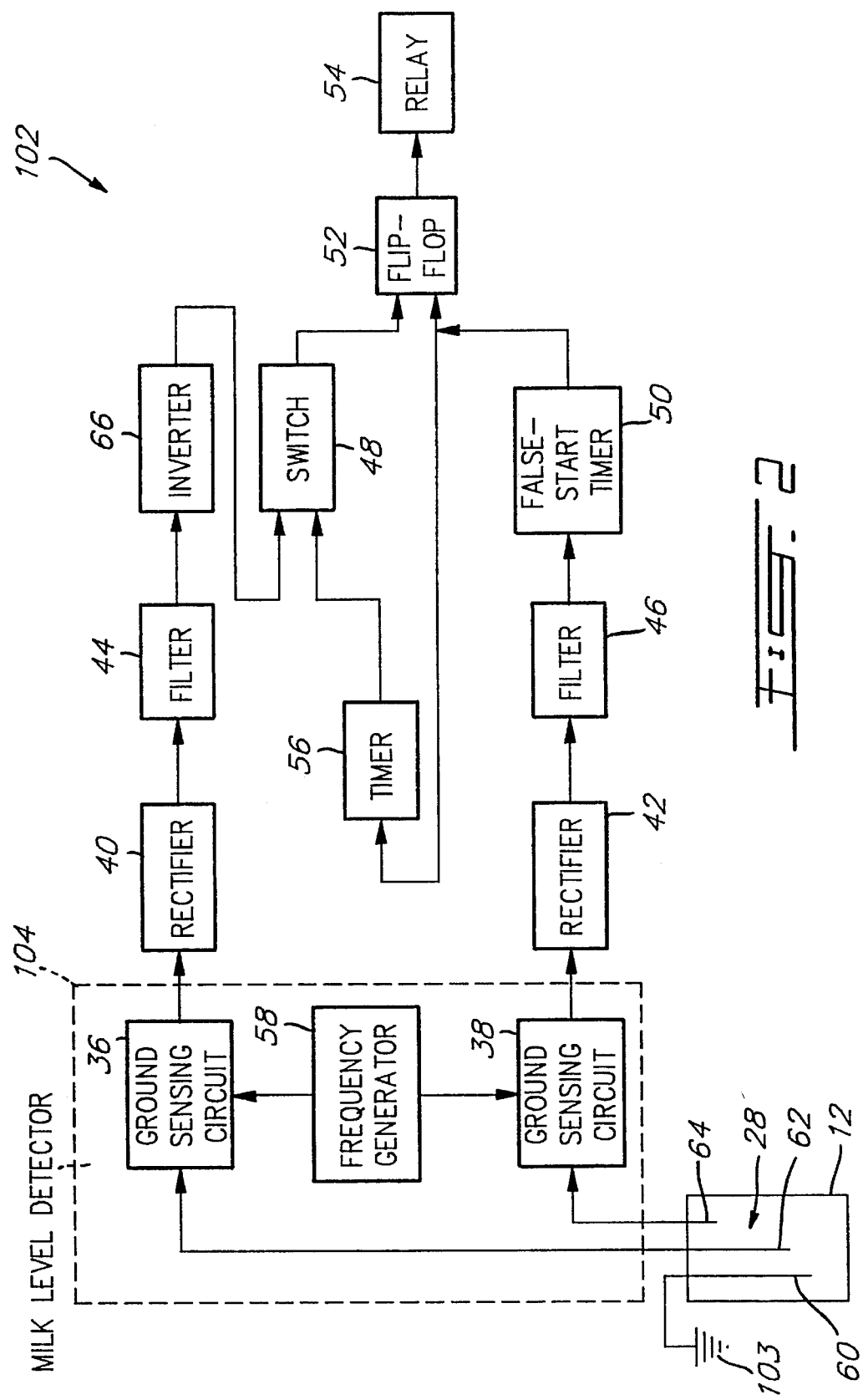
FIG. 2 is a block diagram of an electronic pump controller comprising a milk level detector in accordance with the present invention.

Reference will now be made to FIG. 2, showing a block diagram of an electronic pump controller 102 comprising a milk level detector 104 in accordance with the present invention. Pump controller 102 is designed to replace virtually any prior art pump controller 18 already installed in a milking system such as 10 of FIG. 1. Although the controller 102 can operate with any of the electrode arrangements of FIGS. 4, 5 and 6, it will be described hereinafter with particular reference to the arrangement of electrodes 60, 62 and 64 of FIG. 6.

In the preferred embodiment of the milk level detector of the invention, the lower reference electrode 60 is grounded at 103. The high-level electrode 64 is connected to a ground sensing circuit 38 whose function is to detect, by means of a square wave generated by a frequency generator 58 whether the high-level electrode 64 is in contact with the ground 103 through milk contained in the jar 12 and the lower reference electrode 60. The structure and operation of the ground sensing circuit 38 of detector 104 will be explained in the following description.

If the high-level electrode 64 is effectively grounded through the electric connection established by the milk between the electrodes 60 and 64, the output of the ground sensing circuit 38 is a square wave converted into direct current by a rectifier 42 followed by a low-pass filter 46. The output of the filter 46 is then a 12 Vdc signal supplied to a false-start timer 50 provided to block short duration pulses generated at the output of the filter 46 in response to milk dribbling momentarily interconnecting the electrodes 60 and 64. When the 12 Vdc signal from the filter 46 is constant for a given period of time, it is transmitted through the false-start timer to the set input of a flip-flop 52 to energize the coil of a relay 54 whose normally open contacts close to activate the pump 16.

The output of the false-start timer 50 is also connected to an input of a second timer 56. When the electrode arrangement includes no low-level sensing electrode 62 (see FIGS. 4 and 5), the timer 56 will generate a signal of given duration supplied to the reset input of the flip-flop 52 through a switch 48 positioned to connect the output of the timer 56 to the reset input of the flip-flop 52. At the end of the signal from the timer 56, the flip-flop 52 is reset to open the contacts of the relay 54 and thereby stop operation of the pump 16. The period of operation of the pump 16 therefore corresponds to the given duration of the signal from the timer 56 when no low-level electrode 62 is provided.

Of course, the low-level sensing electrode 62, when provided, is in contact with the milk if the level of milk has reached the high-level electrode 64. The low-level sensing electrode 62 is then grounded through the electric connection established by the milk between the electrodes 60 and 62. As the ground sensing circuit 36 of the milk level detector 104 is identical to the ground sensing circuit 38, the output thereof is a square wave converted into direct current by serially interconnected rectifier 40 and low-pass filter 44. The output of the filter 46 is then a 12 Vdc signal inverted at 66 and supplied to the reset input of the flip-flop 52 through the switch 48 which is then positioned to connect the output of the inverter 66 to the reset input of the flip-flop.

If a 12 Vdc signal is present at the output of the filter 44, the output of the inverter 66 will be 0 Vdc signal. If a 0 Vdc signal is present at the output of the filter 44, the output of the inverter 66 will be a 12 Vdc signal.

Therefore, a 0 Vdc signal is applied to the reset input of the flip flop 52 as long as the milk in the jar 12 electrically interconnects the electrodes 62 and 60. As the pump 16 operates the level of milk in the jar 12 lowers and as soon as the milk no longer interconnects the electrodes 60 and 62, the electrode 62 is no longer grounded. A 12 to 0 Vdc transition of the signal at the output of the filter 44 then occurs and causes a 0 to 12 Vdc transition at the output of the inverter 66. The latter transition reset the flip-flop 52 to de-energize the coil of the relay 54 and open the contacts thereof to thereby interrupt operation of the pump 16.

Appended FIG. 3 shows the electronic circuit of the ground sensing circuit 36,38 of the milk level detector 104. It comprises an operational amplifier 66, two resistors 68 and 70 and a capacitor 72.

The output of the frequency generator 58 is connected to the non-inverting input 76 of the operational amplifier 66 to supply this non-inverting input with a low amplitude square wave of given frequency assuming alternately for equal lengths of time positive and negative, identical amplitudes.

The resistor 70 is connected between the output 78 and the inverting input 74 of the operational amplifier 66, the resistor 68 is connected between the inverting input 74 of amplifier 66 and the electrode 64, and the capacitor 72 is connected between the output 78 of the operational amplifier 66 and the electrode 64.

In operation, two situations are met; a first one when the level of milk is not high enough to electrically interconnect the electrode 64 with the ground electrode 60 and a second one when the level of milk is high enough to electrically connect the electrode 64 with the ground electrode 60.

In the first situation, the electrode 64 is not in contact with the ground whereby the inverting input 74 of the operational amplifier 66 is almost floating. Full floating of the input 74 is prevented by the capacitor 72 through which input 74 is connected to the output 78. In this situation, the output 78 of the operational amplifier 66 reflects the low amplitude square wave applied to the non-inverting input 76 by the frequency generator 58. The function of the capacitor 72 is to stabilize the inverting input 74 at each transition of the square wave from the generator 58 between positive and negative amplitudes (transition pulses).

In the second situation, the high-level sensing electrode 64 is in contact with the ground via the milk and the grounded electrode 60 to thereby enable current from the inverting input 74 to flow to the ground through the resistor 68. This enables flow of currents $I_1$ and $I_2$ through the resistors 70 and 68, respectively. These currents $I_1$ and $I_2$ have essentially the same amplitude since, as well known to those of ordinary skill in the art, almost no current is entering the non-inverting and inverting inputs of an operational amplifier. The values of the resistors 68 and 70 are not critical as long as they are selected to produce a gain sufficient to cause saturation of the operational amplifier 66 in response to each positive and negative pulse of the square wave supplied by the frequency generator 58 to the inverting input 76. Saturation of the operational amplifier 66 will cause the output 78 to alternate between the two supplied voltages, for example +12 Vdc and −12 Vdc, at substantially the same frequency as that of the frequency generator 58.

The animals, including the cows, have a high sensitivity to electric current of 60 Hz. This sensitivity to electric current of the cows substantially reduce at frequencies situated within a frequency range substantially higher than 60 Hz, in particular between 0.5 kHz and 1 MHz. Therefore, the sensitivity of the cows being milked to the stray currents having a frequency situated within the above mentioned frequency range substantially reduce. Another advantage of the frequency range of 0.5 kHz– 1 MHz is that at these frequencies the capacitive impedance formed by the two electrodes and water containing or not detergent or acid, during washing of the milking system is substantially reduced to enable a detectable current to be generated through the water with a voltage applied to the electrodes limited to very low values.

Although the frequency of the square wave from the generator 58 may be set within the range extending between 0.5 kHz and 1 MHz, the use of frequencies higher than 50 kHz will require adjustment of the length of the conductors interconnecting the electrodes to the controller 102 to prevent undue wave reflections and enable detection of the very low currents involved. Experimentation has shown that 15 kHz is an excellent compromise to avoid such length adjustment.

It should also be pointed out here that the ground sensing circuits 36 and 38 limit the amplitude of the current that can flow through the milk to a maximum low value determined by the amplitude of the voltage supplying the operational amplifier 66, the values of the resistors 68 and 70 and the amplitude of the square wave supplied to the non-inverting input 76.

EXAMPLE

The following example demonstrates proper operation of the ground sensing circuits 36 and 38 of the milk level detector of the present invention. The set of values given hereinafter is only illustrative an in no way limitative.
Values of components:
    resistor 68=50 k-ohms;
    resistor 70=1 M-ohms;
    capacitor 72=150 pF;
    amplifier=TL 084.
Frequency generator:
    frequency=15 kHz;
    voltage of the square wave=±0.580 V.

When the level of milk reach the electrode 64, this electrode is electrically in contact with the grounded electrode 60. In response to a positive pulse on the input 76, the output 78 saturates to the positive supply voltage (+12 Vdc) of the operational amplifier 66; in response to a negative pulse, the output 78 saturates to the negative supply voltage (−12 vdc).

To better illustrate the operation of the ground sensing circuit 36,38 a positive pulse of the square wave from the frequency generator 58 will be considered. Application of this positive pulse on the non-inverting input 76 causes saturation of the output 78 to +12 Vdc.

The current $I_1$ flowing through resistor 70 is equal to 11.42 µA. Since there is no current supplied to the inverting input 74 of the amplifier 66 the current $I_2$ flowing through the resistor 68 is equal to $I_1$. Therefore, a current of 11.42 µA flows through the milk between the electrodes 60 and 64. As the voltage on the inverting input 74 is substantially equal to the voltage on the non-inverting input 76, and as a voltage drop of 0.571 V is produced across the resistance 68, a voltage of 0.009 V appears on the electrode 64.

Of course, the above values are theoretical but demonstrate that the current and voltage involved are very low and are not susceptible to affect the animal(s) being milked.

Although the present invention has been described hereinabove by way of a preferred embodiment thereof, this embodiment can be modified at will, within the scope of the appended claims, without departing from the spirit and nature of the subject invention. In particular, the present invention can be applied to the milking of animals other than cows.

What is claimed is:

1. An electric device for detecting the level of milk in a receptacle in view of controlling said level of the milk, said receptacle being installed in a milking system for accumulating milk drawn through piping of the milking system from at least one animal being milked, and said receptacle comprising at least two electrodes mounted therein to contact milk when a predetermined level of milk is reached in the receptacle, said milk level detecting device comprising:

an alternating current source for generating a detecting alternating current having a frequency situated with a frequency range comprised between 0.5 kHz and 1 MHz, said alternating current source being connected to the two electrodes whereby the detecting alternating current flows through said alternating current source and the two electrodes when said two electrodes contact milk; and means for sensing the detecting alternating current to thereby detect reaching of said predetermined level of milk;

wherein the frequency of the detecting alternating current, situated within the frequency range comprised between 0.5 kHz and 1 MHz, reduce the sensitivity of the animal being milked to any stray current originating from said alternating current source and reaching the animal being milked.

2. A milk level detecting device as defined in claim 1, wherein the detecting alternating current has a frequency of 15 kHz.

3. An electric device for detecting the level of liquid in a receptacle in view of controlling said level of the liquid, said receptacle being installed in a milking system for accumulating either milk drawn through piping of the milking system from at least one animal being milked or water during a washing operation of the milking system to remove milk residue from the inner surface of said piping, said receptacle comprising at least two electrodes mounted therein to contact liquid when a predetermined level of liquid is reached in the receptacle, said level detecting device comprising:

an alternating current source for generating a low amplitude detecting alternating current having a frequency situated within a frequency range comprised between 0.5 kHz and 1 MHz, said alternating current source being connected to the two electrodes whereby the low amplitude detecting alternating current flows through said alternating current source and the two electrodes when said two electrode contact liquid; and means for sensing said low amplitude detecting alternating current to thereby detect reaching of said predetermined level of liquid;

wherein the frequency of the low amplitude detecting alternating current, situated within the frequency range comprised between 0.5 kHz and 1 MHz, both reduce:
(a) the sensitivity of the animal being milked to any stray current originating from the alternating current source and reaching the animal being milked; and
(b) a capacitive impedance formed by the two electrodes contacting water during said washing operation whereby said low amplitude detecting alternating current is established both in milk and water with low amplitude voltages applied to the two electrodes so that any stray current originating from said alternating current source and reaching the animal being milked has a low amplitude.

4. A level detecting device as defined in claim 3, wherein the low amplitude detecting alternating current has a frequency of 15 kHz.

5. A level detecting device as defined in claim 3, wherein a first one of said at least two electrodes is grounded.

6. A level detecting device as defined in claim 3, in which said said alternating current source comprises means for limiting the low amplitude of said detecting alternating current.

7. An electric device for detecting the level of liquid in a receptacle in view of controlling said level of the liquid, said receptacle being installed in a milking system for accumulating either milk drawn through piping of the milking system from at least one animal being milked or water during a washing operation of the milking system to remove milk residue from the inner surface of said piping, said receptacle comprising at least first and second electrodes mounted therein to contact liquid when a predetermined level of liquid is reached in the receptacle, said level detecting device comprising:

an alternating current source for generating a low amplitude detecting alternating current having a frequency situated within a frequency range substantially higher than 60 Hz, said first electrode being grounded and said alternating current source being connected to both the first and second electrodes whereby the low amplitude detecting alternating current flows through said alternating current source and the first and second electrodes when said first and second electrodes contact liquid; and means for sensing the low amplitude detecting alternating current to thereby detect reaching of said predetermined level of liquid, said means for sensing the low amplitude detecting alternating current comprising an electronic amplifying circuit responsive to grounding of said second electrode when said first and second electrodes contact liquid for amplifying an input voltage having said frequency of the low amplitude detecting alternating current;

wherein the frequency of the low amplitude detecting alternating current, situated within the frequency range substantially higher than 60 Hz, both reduce:
(a) the sensitivity of the animal being milked to any stray current originating from the alternating current source and reaching the animal being milked; and
(b) a capacitive impedance formed by the first and second electrodes contacting water during said washing operation whereby said low amplitude detecting alternating current is established both in milk and water with low amplitude voltages applied to the two electrodes so that any stray current originating from said alternating current source and reaching the animal being milked has a low amplitude.

8. A level detecting device as defined in claim 7, wherein said electronic amplifying circuit comprises:

an operational amplifier comprising a non-inverting input, an inverting input connected to the second electrode through a first resistor, and an output connected to said inverting input through a second resistor and to the second electrode through a capacitor; and a frequency generator comprising an output for supplying said input voltage to the non-inverting input of the operational amplifier;

whereby grounding of the second electrode enables said low amplitude detecting alternating current to flow from the inverting input of the operational amplifier through the first resistor, the first and second electrodes contacting liquid, and the ground, detection of said low amplitude detecting alternating current being indicated by an amplified version of said input voltage from the frequency generator appearing on the output of the operational amplifier.

\* \* \* \* \*